United States Patent [19]

Lin

[11] Patent Number: 4,921,080
[45] Date of Patent: May 1, 1990

[54] HYDRAULIC SHOCK ABSORBER

[76] Inventor: Chien H. Lin, No. 113, Chung Shan Rd., Farn Chang Villiage, Charng Chih Hsiang, Ping Tung Hsien, Taiwan

[21] Appl. No.: 350,129

[22] Filed: May 8, 1989

[51] Int. Cl.$^5$ ............................................. F16F 9/46
[52] U.S. Cl. ................................. 188/299; 188/311; 188/314; 188/322.13
[58] Field of Search ............... 188/299, 313, 314, 318, 188/319, 322.13, 322.14, 311, 312, 276, 281, 282, 286, 298, 301; 267/64.15, 217, 221, 226, 64.16–64.18, 64.25, 186; 280/707; 440/61

[56] References Cited

U.S. PATENT DOCUMENTS

| | | | |
|---|---|---|---|
| 2,756,989 | 7/1956 | Péras | 188/314 X |
| 2,926,023 | 2/1960 | Kraus | 267/64.25 X |
| 2,945,677 | 7/1960 | Kammerer, Jr. | 188/314 X |
| 3,090,611 | 5/1963 | Schultze | 267/186 |
| 3,222,047 | 12/1965 | Tuczek | 267/64.25 X |
| 3,321,210 | 5/1967 | Delchev | 188/299 X |
| 3,465,851 | 9/1969 | Callegari et al. | 188/312 |
| 3,638,885 | 2/1972 | Reed | 188/313 X |
| 3,653,613 | 4/1972 | Palmer et al. | 188/299 X |
| 3,807,678 | 4/1974 | Karnopp et al. | 188/299 X |
| 3,960,251 | 6/1976 | Gorissen | 188/318 X |
| 4,084,668 | 4/1978 | Rybicki | 188/318 X |
| 4,091,897 | 5/1978 | Andreport | 188/314 |
| 4,463,838 | 8/1984 | Jacottet | 188/311 X |
| 4,491,207 | 1/1985 | Boonchanta et al. | 188/299 X |
| 4,493,659 | 1/1985 | Iwashita | 188/299 X |
| 4,511,022 | 4/1985 | Thomas et al. | 188/299 |
| 4,545,769 | 10/1985 | Nakahama et al. | 188/299 X |
| 4,589,528 | 5/1986 | Axthammer et al. | 188/299 X |
| 4,597,411 | 7/1986 | Lizell | 188/299 X |
| 4,639,013 | 1/1987 | Williams et al. | 188/299 X |
| 4,655,440 | 4/1987 | Eckert | 188/299 X |
| 4,720,085 | 1/1988 | Shinbori et al. | 188/299 X |
| 4,786,034 | 11/1988 | Heess et al. | 188/314 X |
| 4,813,519 | 3/1989 | Matsubara et al. | 188/299 |
| 4,826,205 | 5/1989 | Kouda et al. | 188/299 X |

Primary Examiner—Douglas C. Butler
Attorney, Agent, or Firm—Thomas S. Keaty

[57] ABSTRACT

A hydraulic shock absorber for a vehicle comprising a hydraulic cylinder with a piston which divides the cylinder into an upper compartment and a lower compartment, a damping chamber, and a return chamber. A control valve is provided in the path from the damping chamber to the upper compartment. A shock sensor is provided to detect the shock to which the vehicle is subject. When the shock exceeds a predetermined level, the shock sensor will give a signal to the control valve to close it, thus ensuring the shock to be absorbed by a spring in the damping chamber.

1 Claim, 3 Drawing Sheets

HYDRAULIC SHOCK ABSORBER

The present invention relates to an improvement in hydraulic shock absorber for the suspension system of vehicles.

Conventional hydraulic shockabsorber comprises a hydraulic cylinder with a double-action piston of which the piston rod is connected to the hull of the vehicle and which divides the hydraulic cylinder, into an upper compartment and a lower compartment, a damping chamber and a return chamber. When the vehicle is subject to a vertical shock, the piston is pressed downwardly and the oil in the lower compartment is pressed to flow through a lower tube into the damping chamber in which a spring-loaded piston is pressed so that the spring is compressed to absorb the shock. The oil in the damping chamber can flow into the upper compartment of the hydraulic cylinder through an upper tube. When the spring of the damping chamber is compressed, the oil-filled space of the damping chamber is enlarged, thus the volume of the oil flowing into the upper compartment is smaller than the volumetric extension of the upper compartment, thus a vacuum will be created in the upper compartment. To eliminate this vacuum, a return chamber is provided to supply oil to the upper compartment to fill up the vacuum. Like the damping chamber, the return chamber also has a spring-loaded piston, and is communicated respectively with the upper compartment and lower compartment through another upper tube and anoter tube. A one-way valve is provided in the lower tube.

The disadvantage of this device is that when the vehicle is subject to a strong shock, the oil in the lower compartment may still directly pass through the damping chamber and then enter the upper compartment without compressing the spring in the damping chamber or only with a slight compression thereof. As a result, the spring in the damping chamber absorbs no shock or only a little shock. Thus the shock-absorbing function of this device only relies upon the damping effect caused the the oil flowing through a narrow path (for example, an orifice) between the upper compartment, lower compartment and the damping chamber. The efficiency of such shock-absorption is very poor.

In some cases, a vehicle is subject to a terrible shock, which, if not properly abosrbed, may make the occupants feel extremely uncomfortable. For example, a sudden braking or acceleration may cause the hull to "sink" down. Also, when the vehicle turns a great angle at relatively high speed, the centrifugal force may cause the wheels of the outside to rise and the hull of the inner side to sink. This effect is called "sideway rolling" and is conventionally reduced by an anti-roll bar. However, the anti-roll bar can only abosrb a limited portion of the centrifugal force. The majoirty of the shock still has to be absorbed by the shock absorber if the shock is very strong. For example if the vehicle turns a great angle, the centrifugal force (and therefore the shock) is too strong to be outbalanced by the anti-roll bar. The vehicle may upset to the outer side. The risk of upset is even greater if the inner wheels run over a stone, a mound or the like. If the shock absorber cannot effectively absorb the excessive shock, the risk of upset cannot be relieved.

Accordingly it is the object of this invention to provide a shock absorber by which the aforesaid disadvantage is effectively obviated.

According to this invention, the absorption of a strong shock is ensured by closing the path from the damping chamber into the upper compartment of the hydraulic cylinder, so as to ensure the compression of the spring in the damping chamber. For this purpose, a control valve is provided between the damping chamber and the upper compartment of the hydraulic cylinder. The control valve is closed when the vehicle is subject to a strong shock. To detect the shock, a shock sensor is provided at the chassis of the vehicle. When the shock exceeds a predetermined value, the sensor will give a signal to close the control valve. Thus the oil flowing from the lower compartment of the hydraulic cylinder does not flow directly into the upper compartment thereof, but causes the compression of the spring in the damping chamber. Accordingly almost all the shock is absorbed by this spring.

This invention will be better understood when read in connection with the accompanying drawing, in which:

BREIF DESCRIPTION OF THE DRAWING

DETAILED DESCRIPTION OF PREFERRED EMBODIMENT

Figure 1:
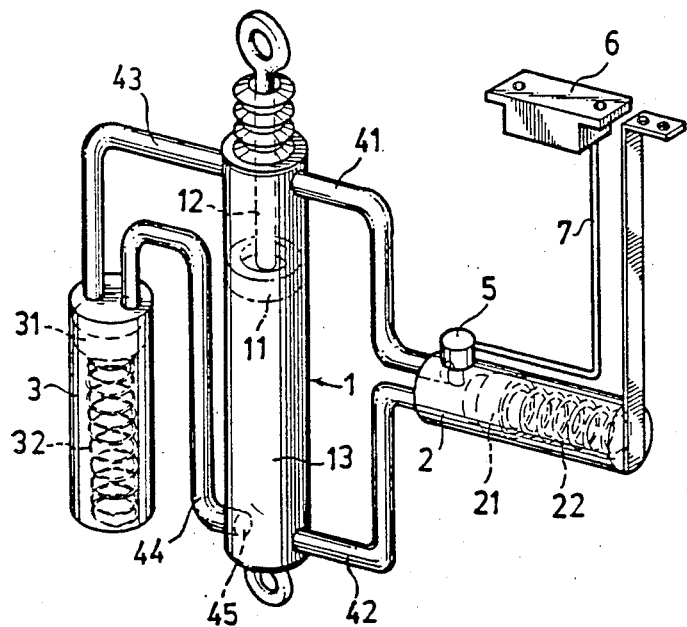
FIG. 1 is a perspoective view of the shock absorber of this invention.

Referring to FIG. 1 the shock absorber comprises, as stated before, a hydraulic cylinder (1), a damping chamber (2) and a return (3). A double-action piston (11) divides the interior of the hydraulic cylinder into an upper compartment (12) and a lower compartment (13). The upper compartment (12) and the lower compartment (13) are respectively communicated with the damping chamber (2) and the return chamber (3) via upper tubes (41) (43) and lower tubes (42), (44), which are respectively provided above the upper dead point and below the lower dead point of the hydraulic cylinder (1). The damping chamber (2) has a piston (21) supported by a spring (22). Likewise the return chamber (3) also has a piston (31) supported by a spring (32). A one-way valve (45) which opens only toward the lower compartment (13) is provided at one position of lower tube (44). All the above elements are not the characteristic features of this invention, thus their details are not necessary. As stated before, the feature of this invention consists in a control valve (5) located at one end of the upper tube (41), and a shock sensor (6) connected to the control valve (5) via an electrical wire (7).

Figure 2:
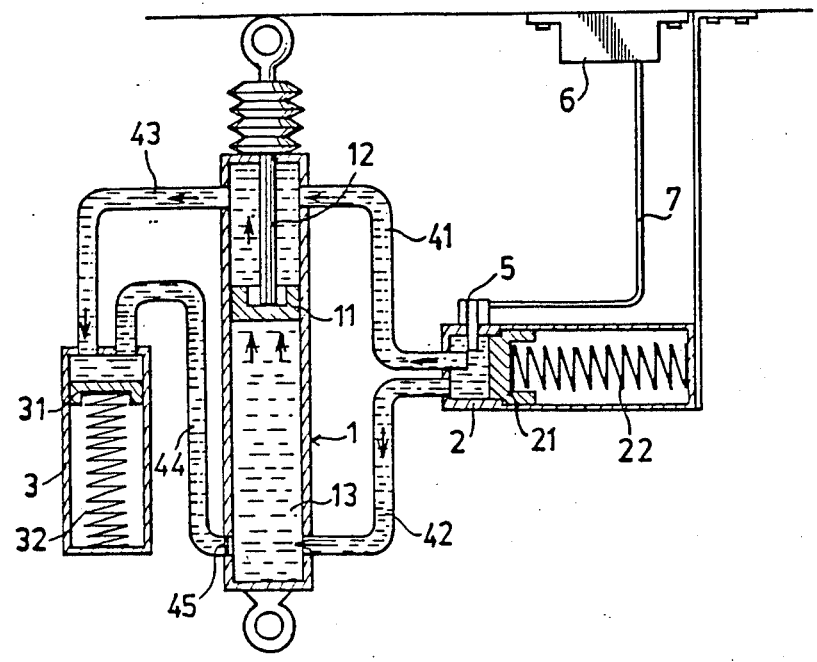
FIG. 2 is a sectional view of this invention with the valve opened.

Referring to FIG. 2, normally, when there is no shock or the shock is below a predetermined level, the shock sensor (6) gives no signal to the control valve (5) and the control valve (5) remains in its open position. A gentle shock only causes the piston to move up and down without compressing the spring (22), and is absorbed by the damping effect caused by the flowing of the oil through the narrow tubes (41), (42). In other words, when the piston (11) moves downward, the oil in the lower chamber (13) flows through lower tube (42) into the damping chamber and then through the valve (5) and the upper tube (41) into the upper compartment (12). The volumetric decrease of the lower compartment (13) is equal to the volumetric increase of the upper compartment (12). Thus the oil-filled volume of damping chamber (2) and the return chamber (93) is not changed.

Figure 3:
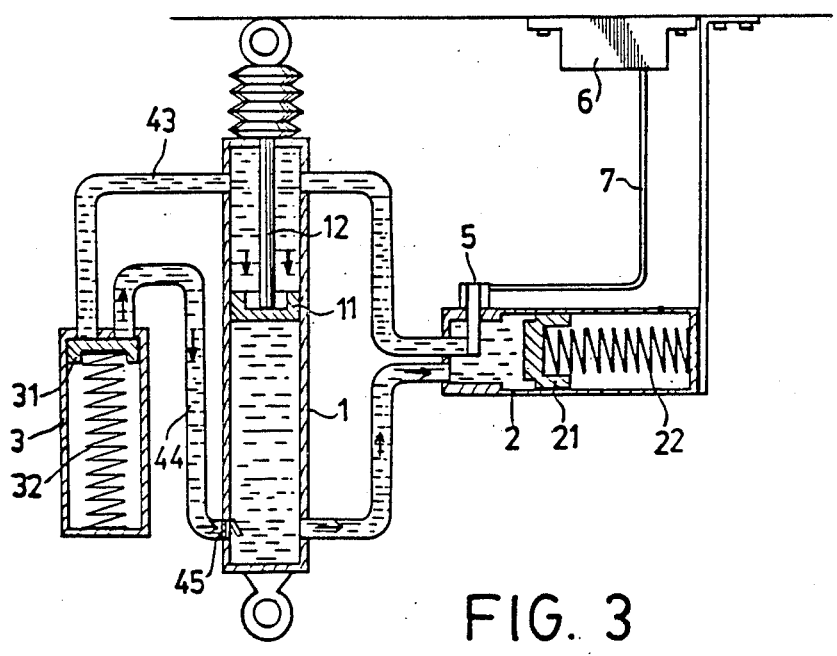
FIG. 3 is a sectional view of this invention with the valve closed.

Referring to FIG. 3, when the shock exceeds a predetermined level, the shock sensor (6) will give a signal to the control valve (5) and the control valve (5) is closed. The shock causes the piston (11) to move (11) downwardly a distance, thus an amount of oil in the lower chamber (13) flows through lower tube (42) into the damping chamber (2). Since the control valve (5) is closed now, the entry of the oil causes the oil-filled volume of the damping chamber (2) to increase, thus causing the compression of the spring (22). The downward movement of the piston (11) causes a volumetric increase in the upper compartment. Since the control valve (5) is closed now, the increased volume cannot be filled up by the oil from the damping chamber, and the vacancy causes a vacuum which sucks oil from the return chamber (3) to flow into the upper compartment (12) to fill up the increased volume.

When the shock is over, the downward pressure of the piston (11) decreases, thus the spring (22) will force the oil in the damping chamber (2) to flow back into the upper compartment, causing the piston (11) to move upward, and the shock sensor (6) is no longer subject to the great stress. Thus the control valve (5) is opened. The upward stroke of the piston (11) causes the oil in the upper compartment (12) to flow through upper tube (43) back into the return chamber (3), and compresses the spring (32) to its original position. From FIG. 2 and FIG. 3, we see that the stroke of the piston (11) can be very small, since the most shock is absorbed by the spring (22). Thus the occupants will not suffer the uncomfort caused by the strong shock, and the risk of upset of the vehicle is effectively relieved.

Figure 4:
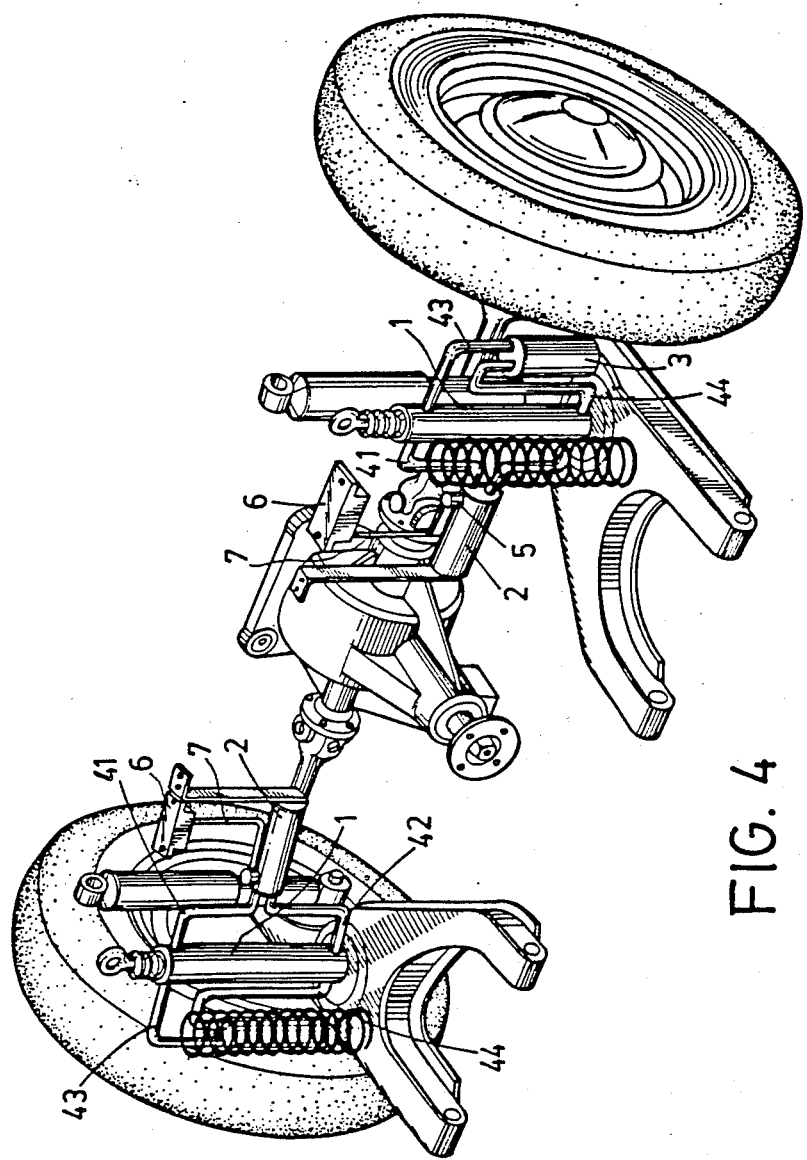
FIG. 4 is a perspective view showing this invention mounted on the corresponding portion of a vehicle.

FIG. 4 shows two shock absorbers of this invention mounted on a suspension system of the rear wheels of a vehicle.

I claim:

1. A hydraulic shock absorber for a vehicle comprising:

a vertically mounted hydraulic cylinder with a double action piston which divides the interior of said hydraulic cylinder into an upper chamber or compartment and a lower chamber or compartment;

a damping chamber in form of a hydraulic cylinder with a piston supported by a first spring and a first tube to connect with said upper chamber and a second tube to connect with said lower chamber; and a return chamber, in form of a hydraulic cylinder with a piston supported by a second spring and a third tube to connect with said upper chamber and a fourth tube to connect with said lower chamber;

said fourth tube being provided with a one-way valve which only opens to the direction toward said hydraulic cylinder;

characterized by that a control valve and a shock sensor are provided;

said control valve being provided in a position of said first tube to prevent the oil in said damping chamber from flowing into said upper compartment and controlled by a signal from said shock sensor;

said shock sensor being provided on a position of said vehicle to detect the shock to which said vehicle is subject and being responsive to a shock exceeding a predetermined level to give said signal to said control valve.

* * * * *